United States Patent [19]

Kobayashi et al.

[11] Patent Number: 5,419,961
[45] Date of Patent: May 30, 1995

[54] MAGNETIC RECORDING MEDIUM WITH SPECIFIED TRANSVERSE AND MACHINE DIRECTION YOUNG'S MODULUS OF THE POLYESTER FILM BASE

[75] Inventors: Osamu Kobayashi, Ibaragi; Takayuki Deno; Ikuo Matsumoto, both of Mito, all of Japan

[73] Assignee: Victor Company of Japan, Ltd., Yokohama, Japan

[21] Appl. No.: 154,875

[22] Filed: Nov. 19, 1993

[30] Foreign Application Priority Data

Nov. 20, 1992 [JP] Japan .................................. 4-335153

[51] Int. Cl.$^6$ ........................ B32B 33/00; G11B 5/704
[52] U.S. Cl. ..................................... 428/336; 428/490; 428/910; 428/694 ST; 428/694 B; 428/694 SL
[58] Field of Search ................. 428/480, 694 ST, 910, 428/694 B, 694 SL, 336

[56] References Cited

U.S. PATENT DOCUMENTS

5,196,265  3/1993  Ryoke et al. ........................ 428/332

FOREIGN PATENT DOCUMENTS

56-11624   2/1981  Japan .
62-62424   3/1987  Japan .
63-298810 12/1988  Japan .
4-44628    2/1992  Japan .

*Primary Examiner*—P. C. Sluby
*Assistant Examiner*—David Abraham
*Attorney, Agent, or Firm*—Michael N. Meller

[57] ABSTRACT

The present invention provides a magnetic recording medium such as a magnetic tape suitable for long play with the thickness of the magnetic tape bring less than or equal to 12.5 without degrading the electro-magnetic conversion characteristic of the head-tape contact characteristic of the magnetic tape. The magnetic tape comprises a non-magnetic film base of thickness dA and a magnetic layer on the non-magnetic film base of thickness dM with the ratio of dA/dM≦3.6 and a cupping rate defined as a ratio (A/B×100%) of a height A of a curled tape to a width B of curled tape in the traversing direction of ≦10%. The non-magnetic film vase has a first Young's modulus Y(MD) is a longitudinal direction of the magnetic recording medium and a second Young's modulus Y(TD) in a traversing direction thereof, wherein the first and second Young's modulusli y(MD) and Y(TD) respectively satisfy inequalities (1), (2) defined as follows:

$$Y(TD) \geq Y(MD)/3 + 1000 \ (Kg/mm^2) \quad \ldots (1)$$

$$Y(TD) \geq 1100 \ (Kg/mm^2) \quad \ldots (2)$$

2 Claims, 4 Drawing Sheets

MAGNETIC RECORDING MEDIUM WITH SPECIFIED TRANSVERSE AND MACHINE DIRECTION YOUNG'S MODULUS OF THE POLYESTER FILM BASE

BACKGROUND OF THE INVENTION

1. Field of the Invention

The present invention relates to improvements of a magnetic recording medium used for magnetic recording and/or reproducing apparatus such as a video tape recorder and a digital audio tape recorder, and it particularly relates to a coated-type magnetic recording medium having a non-magnetic film base on which a magnetic layer containing resin is provided.

2. Description of the Related Art

Presently, in a magnetic tape used for a video tape recorder as a magnetic recording medium, a thickness of the magnetic tape is required to be as thin as possible to meet a demand for the magnetic tape capable of long play.

On the other hand, reducing the thickness of the magnetic tape substantially degrades a mechanical strength of the magnetic tape, which also tends to cause degradations of electro-magnetic conversion characteristics because of a degradation of a head-tape contact characteristic between a magnetic head and the magnetic layer and to cause tape damages such as folds and creases by contacting with tape guide members for restricting running of the magnetic tape.

Further, reducing the thickness of the magnetic tape causes a deformation of a recorded pattern (referred to as a degradation of a track linearity, which is required to be less than or equal to 10 μm), which poses degradations of electro-magnetic conversion characteristics and a degradation of an interchangeability of a recorded tape among different tape decks.

As a countermeasure to these problems, it is tried to increase a strength of a polyester film employed as a non-magnetic film base (referred to as a film base) for supporting the magnetic layer thereon and to increase a mechanical strength of the magnetic tape by forming the magnetic layer having a high elastic modulus on the film base, however, this countermeasure does not meet the demand enough.

As measures for improving the strength of magnetic tape, it is proposed in Japanese Laid Open Patent Publication 56-11624/1981 and 62-62424/1987 that aramid resin is employed as the film base instead of the polyester resin. Further, it is proposed in Japanese Laid Open Patent Publication 63-298810/1988 that a Young's modulus Y(TD) in a traversing direction of the magnetic tape is made larger than a Young's modulus Y(MD) in a longitudinal direction of the magnetic tape, and in Japanese Laid Open Patent Publication 4-44628/1992 that the Young's modulusli Y(TD) and Y(MD) in the traversing and longitudinal directions of the magnetic tape are respectively determined to be approximately 800 Kg/mm².

However, when the aramid resin film is employed as the film base of the magnetic tape, it is difficult for a mass-production of magnetic tapes because of a low productivity, as that which increases the manufacturing high cost of the magnetic tape.

Further, even though the Young's modulus Y(TD) in the traversing direction of the magnetic tape is made larger than the Young's modulus Y(MD) in the longitudinal direction, there are problems that the electro-magnetic conversion characteristics of the magnetic tape are degraded due to the degradation of a head-tape contact characteristic if the overall thickness of the magnetic tape is made less than 12.5 μm. Further, even though the Young's modulusli Y(TD) and Y(MD) in the traversing and longitudinal directions of the magnetic tape are respectively determined to be approximately 800 Kg/mm², there are problems that both the mechanical strength and the electro-magnetic conversion characteristic of the magnetic tape are degraded if the overall thickness of the magnetic tape is made less than 12.5 μm.

SUMMARY OF THE INVENTION

Accordingly, a general object of the present invention is to provide a magnetic recording medium in which the above disadvantages have been eliminated.

A more specific object of the present invention is to provide a magnetic recording medium used for a magnetic recording and/or reproducing apparatus comprising, a non-magnetic film base having a film base thickness dA and a first Young's modulus Y(MD) in a longitudinal direction of the magnetic recording medium and a second Young's modulus Y(TD) in a traversing direction thereof, and a magnetic layer provided on a surface of the magnetic recording medium, the magnetic layer having a magnetic layer thickness dM, with the ratio of dA/dM≧3.6 and a cupping rate defined as a ratio (A/B×100%) of a height A of a curled tape to a width B of curled tape in the traversing direction of ≦10%. The magnetic recording medium has an overall thickness less than or equal to 12.5 μm, and the first Young's modulus Y(MD) and the second Young's modulus Y(TD) thereof respectively satisfy inequalities (1) and (2) defined as follows:

$$Y(TD) \geq Y(MD)/3 + 1000 \ (Kg/mm^2) \quad \ldots (1)$$

$$Y(TD) \geq 1100 \ (Kg/mm^2) \quad \ldots (2)$$

Other objects and further features of the present invention will be apparent from the following detailed description when read in conjunction with the accompanying drawings.

BRIEF DESCRIPTION OF THE DRAWINGS

Preferred embodiments of the present invention will be described with reference to the accompanying drawings wherein.

DETAILED DESCRIPTION OF THE INVENTION

Figure 1:
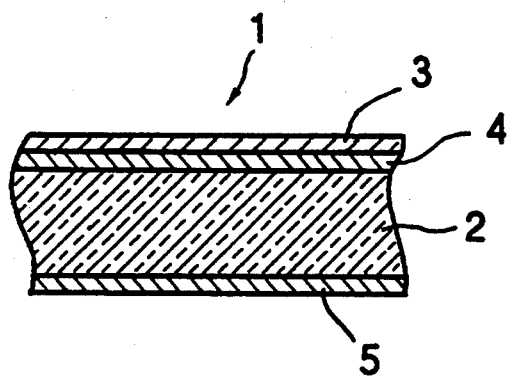
FIG. 1 is a fragmentary cross-sectional view showing an embodiment of a magnetic recording medium of the present invention.

The preferred embodiments of the magnetic recording medium of the present invention are as follows.

(1) An overall thickness of a tape of the present invention is made less than or equal to 12.5 $\mu$m.

(2) Young's modulusli of a film base Y(MD) and Y(TD) in a longitudinal direction and a traversing direction of a tape running satisfy following inequalities (1) and (2):

$$Y(TD) \geq Y(MD)/3 + 1000 \ (Kg/mm^2) \quad \ldots (1)$$

$$Y(TD) \geq 1100 \ (Kg/mm^2) \quad \ldots (2)$$

(3) In addition to the abovementioned conditions, it is preferable that a ratio dA/dM of a film base thickness (dA) to a magnetic layer thickness (dM) of the tape in the present invention satisfies a following inequality (3):

$$dA/dM \geq 3.6 \quad \ldots (3)$$

Further, when the magnetic recording medium of the present invention is to be a magnetic tape (referred to as a tape hereafter), it is desirable that a maximum cupping rate of the tape in a traversing direction of the tape is less than or equal to 10%.

Figure 8:
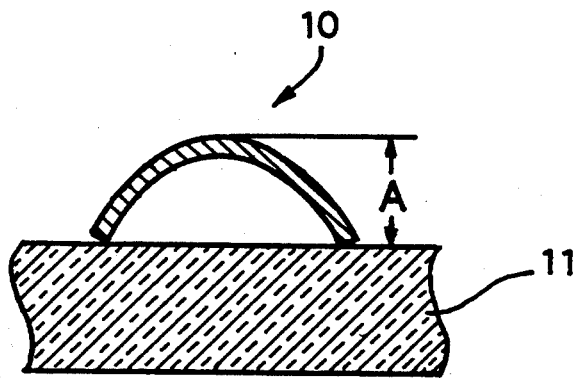
FIG. 8 is a cross-sectional view for explaining a cupping rate of the magnetic recording medium of the present invention.

FIG. 8 is a cross-sectional view for explaining a cupping rate of the magnetic recording medium of the present invention.

The abovementioned cupping rate (%) is defined as follows:

As shown in FIG. 8, when a piece of magnetic tape 10 is placed on a flat plate 11 of glass, the piece of magnetic tape 10 is usually curled in the traversing direction. Then, the curled tape is place on the flat plate 11 with the caved side down, and a height A of the curled tape 10 is determined by measuring a height from a surface of the flat plate 11 to the top of the curled tape 10. Thus, the cupping rate is obtained as a following equation.

$$\text{Cupping rate } (\%) = (A/B) \times 100 \quad \ldots (4)$$

wherein, B is a width of the curled tape 10 in the traversing direction.

The Young's modulus in the present invention designates a value which is obtained from a tensile stress at 0.5% elongation by using a universal tension test device. Further, it is to be noted that a thickness value used in the present invention designates a thickness value in a dried state unless otherwise specified.

Next, a description is given to the above inequalities (1), (2) and (3).

The inequality (1) signifies that the Young's modulus Y(TD) of the film base in the traversing direction of the tape running is required to be more than or equal to 1000 Kg/mm$^2$ and to be increased in proportion to the value of Young's modulus Y(MD) in the longitudinal direction thereof.

As will be described hereafter, it is confirmed from experimental facts that damage to the edge of the tape here and after referred to as "edge damage" seldom occurs when the tape is running provided the Young's modulusli Y(TD) and Y(MD) satisfy the inequality (1). On the other hand, the edge damage of the tape occurs when the Young's modulusli Y(TD) and Y(MD) do not satisfy the inequality (1), which poses a picture noise and a synchronization defect in a reproduced picture, particularly, in a serious case.

Further, when a head-tape contact characteristic is degraded, a signal output characteristic is unstable, and a track linearity is also degraded.

The reason why the Young's modulus Y(TD) in the traversing direction of the tape running is required to be increased in proportion to the value of Young's modulus Y(MD) in the longitudinal direction of the tape running is considered as follows.

Generally, during the tape running in a magnetic recording and reproducing device, a stress is exerted on edge portions of the tape by contacting with upper and lower flanges of a tape restricting guide member of the device, and the stress is dispersed in both the longitudinal and traversing directions of the tape. However, when the Young's modulus Y(MD) in the longitudinal direction of the tape is made larger, the stress is less dispersed in the longitudinal direction of the tape running, thus, the stress exerted is only loaded to the tape in the traversing direction, i.e., depending on the Young's modulus Y(TD). Further, when the Young's modulus Y(TD) is less than 1100 Kg/mm$^2$, the head-tape contact characteristic is degraded, which poses a decease of the signal output from the tape.

Further, when the ratio dA/dM of the film base thickness (dA) to the magnetic layer thickness (dM) is less than 3.6, even a slight edge damage of the tape causes a degradation of head-tape contact, which poses a decrease of an audio signal output, for instance, in the VHS (one of the industry standard formats) video tape recorder.

This reason is considered as follows.

The magnetic layer has a very low flexibility because of containing a large amount of magnetic powder, on the other hand, the film base made of a resin, for instance, a polyester resin, has a high flexibility, thus, it will be understood that the overall flexibility of the tape decreases in proportion to a decrease of the ratio dA/dM of the film base thickness (dA) to the magnetic layer thickness (dM) when the magnetic tape has a predetermined overall thickness.

On the other hand, when the ratio dA/dM is greater than or equal to 3.6 the ratio of the film base thickness to the overall thickness of the magnetic tape increases, so that the flexibility of the tape increases. that case, it should be noted that the film base needs to have a high strength satisfying the inequality (1), otherwise, an improvement of the head-tape contact characteristic can not be expected.

Further, the cupping rate A of the tape is required to be less than or equal to 10% as mentioned hereafter. When the cupping rate A of the tape becomes more than 10%, the track linearity is degraded so that the interchangeability of the tape is lost. Thus, it is preferable that cupping rate A of the tape is less than or equal to 5%.

It is preferable to employ a polyester resin, in particular, polyethylene-naphthalate as the film base in the present invention.

Upon a production of the tape, after the polyethylene-naphthalate is formed into a thin film, each of desired Young's modulusli Y(MD) and Y(TD) of the film base is obtained by causing the thin film to be ductile in both the longitudinal and traversing directions by using a biaxial stretching machine, thus, a desired film base is obtained.

As the magnetic layer, any coated-type magnetic layer containing ferromagnetic powder and resin can be employed, preferably, having the Young's modulus Y(MD) of 700–2200 $Kg/mm^2$ in the longitudinal direction of the tape and a Young's modulus Y(TD) of 200–1800 $Kg/mm^2$ in the traversing direction of the tape running. As the ferromagnetic powder used in the present invention, any ferromagnetic powder of magnetic particles such as metal magnetic particles, iron oxide particles, iron carbide particles, and barium ferrite particles is optionally employed regardless of shapes of the magnetic particles such as a sphere, a acicular shape and a plate.

As mentioned above, the magnetic layer employed in the present invention contains the resin so as to increase an elastic limit of the magnetic layer, otherwise, an improvement for preventing the edge damage of the tape from occurring can not be expected because of a fact that a magnetic layer containing no resin such as a thin-film magnetic layer has a low elastic limit. In the present invention, any resin is employed in the magnetic layer as long as the ferromagnetic powder is dispersed into the resin and the resin satisfies the function of the magnetic layer.

As additives such as inorganic substances to be added into the magnetic layer and the film base, well known additives are employed, as long as the tape comprising the abovementioned magnetic layer and the film base satisfies the physical characteristic defined in claims of the present invention.

Further, in addition to the magnetic layer and the film base, the tape or the magnetic recording medium in the present invention comprises a back coat layer and an under layer provided between the film layer and the magnetic layer, as required. These layers have no limitation in a construction and a production method thereof, for instance, mixing inoganic fillers in the under coat layer and so on, as long as the layers do not contact with the magnetic head directly.

As a countermeasure for limiting the cupping rate of the tape to be less than or equal to 10%, there can be various methods. For instance, a method of annealing the film layer 2. When the coated-type magnetic layer 3 is provided on the film base, a method of decreasing an internal stress of the magnetic layer by causing solvent contained in the magnetic coating to decrease to decrease a percentage of contraction of the coating layer at curing thereof. Further, a method of selecting a binder used in the magnetic coating which binder has less percentage of contraction at the curing. On the other hand, when the magnetic layer 3 is provided by using a vacuum evaporation, it is possible to prevent the internal stress due to forming of the magnetic layer from occurring by using a technique disclosed in, for instance, Japanese Patent Laid-Open Publication 58-166532/1983, Japanese Patent Laid-Open Publication 60-151836/1985, Japanese Patent Laid-Open Publication 60-164930/1985, Japanese Patent Laid-Open Publication 62-219318/1987, Japanese Patent Laid-Open Publication 1-53329/1989, Japanese Patent Laid-Open Publication 2-227824/1990 or Japanese Patent Laid-Open Publication 3-266219/1991.

Since the binder used in the back coating layer 5 effects greatly, it is possible to control the cupping rate by balancing binder components between the back coating layer 5 and the magnetic layer 3.

Further, the production method of the tape or the magnetic recording medium in the present invention has no limitation, as long as the magnetic layer is provided on the film base so as to have a predetermined thickness and to have a cupping rate less than or equal to 10%.

It should be noted that the magnetic layer thickness is defined as a thickness of a recorded medium. In other words, when the tape is produced through the well known calender process, the magnetic layer thickness designates the thickness of the magnetic layer after undergoing the calender process. Further, there is no limitation regarding the production or coating method of the magnetic layer, the orientation method of the ferromagnetic particles and the slitting method of the tape in the present invention.

Next, a description is given to embodiments 1–21 of the present invention and comparative examples 1–38.

FIG. 1 is a fragmentary cross-sectional view showing an embodiment of a magnetic recording medium of the present invention.

In a magnetic recording medium 1 of the present invention, a magnetic layer 3 containing ferromagnetic particles is provided on a non-magnetic film base 2 (referred to as a film base hereafter). An undercoating layer 4 is optionally provided between the film base 2 and the magnetic layer 3 to improve a head-tape contact characteristic. Further, a back coating layer 5 is optionally provided on the back surface of the film base 2 to improve a tape running characteristic and a light excluding effect. Other layers such as double magnetic layer are also provided, if required. It should be noted that an overall thickness of the magnetic recording medium 1 containing the film base 2, the magnetic layer 3 and other layers is made less than or equal to 12.5 μm.

Embodiments 1–10

At first, a magnetic coating mixture containing components described hereafter was sufficiently mixed and dispersed in a mixer. Then, the magnetic coating mixture was coated on one surface of each of non-magnetic wide film bases 2 of embodiments 1–10 each having Young's modulusli Y(TD), Y(MD) and a thickness shown in Table 1 as a magnetic

TABLE 1

|      |   | Overall Thickness (μm) | Thickness of mag. layer (μm) | Thickness of film base (μm) | dA/dM | Young's modulus of film base | | Edge damage | Audio output (dB) | R F output (dB) |
|------|---|---|---|---|---|---|---|---|---|---|
|      |   |   |   |   |   | M D | T D |   |   |   |
| Emb. | 1 | 12.5 | 2.4 | 9.6 | 4 | 710 | 1410 | ○ | −2.2 | −0.2 |
|      | 2 | ↑ | 2.5 | 9.5 | 3.8 | ↑ | ↑ | ○ | −2.5 | 0.1 |

TABLE 1-continued

|  |  | Overall Thickness (μm) | Thickness of mag. layer (μm) | Thickness of film base (μm) | dA/dM | Young's modulus of film base | | Edge damage | Audio output (dB) | R F output (dB) |
| --- | --- | --- | --- | --- | --- | --- | --- | --- | --- | --- |
|  |  |  |  |  |  | M D | T D |  |  |  |
|  | 3 | ↑ | 2.6 | 9.4 | 3.6 | ↑ | ↑ | ○ | −3.4 | 0 |
|  | 4 | ↑ | 2.4 | 9.6 | 4 | 570 | 1200 | ○ | −2.8 | −0.3 |
|  | 5 | ↑ | 2.5 | 9.5 | 3.8 | ↑ | ↑ | ○ | −3.4 | −0.5 |
|  | 6 | ↑ | 2.6 | 9.4 | 3.6 | ↑ | ↑ | ○ | −3.8 | −0.3 |
| Comp. | 1 | 12.5 | 2.7 | 9.3 | 3.44 | 710 | 1410 | ○ | −9.2 | −0.2 |
|  | 2 | ↑ | 2.8 | 9.2 | 3.28 | ↑ | ↑ | ○ | −11.9 | −0.2 |
|  | 3 | ↑ | 3 | 9 | 3 | ↑ | ↑ | ○ | −12.1 | −0.3 |
|  | 4 | ↑ | 2.7 | 9.3 | 3.44 | 570 | 1200 | ○ | −8.2 | −0.4 |
|  | 5 | ↑ | 2.8 | 9.2 | 3.28 | ↑ | ↑ | Δ | −10.7 | −0.5 |
|  | 6 | ↑ | 3 | 9 | 3 | ↑ | ↑ | Δ | −12.8 | −0.5 |
|  | 7 | ↑ | 2.4 | 9.6 | 4 | 670 | 1110 | X | −8.1 | −0.6 |
|  | 8 | ↑ | 2.5 | 9.5 | 3.8 | ↑ | ↑ | X | −9.3 | −0.8 |
|  | 9 | ↑ | 2.6 | 9.4 | 3.6 | ↑ | ↑ | X | −10.8 | −0.6 |
|  | 10 | ↑ | 2.7 | 9.3 | 3.44 | ↑ | ↑ | X | −11.7 | −0.7 |
|  | 11 | ↑ | 2.8 | 9.2 | 3.28 | ↑ | ↑ | X | −12.9 | −0.7 |
|  | 12 | ↑ | 3 | 9 | 3 | ↑ | ↑ | X | −13.2 | −0.7 |
| Emb. | 7 | 12.5 | 2.6 | 9.4 | 3.6 | 400 | 1150 | ○ | −3.8 | −0.5 |
|  | 8 | ↑ | ↑ | ↑ | ↑ | 560 | 1530 | ○ | −2.2 | 0 |
|  | 9 | ↑ | ↑ | ↑ | ↑ | 820 | 1300 | ○ | −3.1 | −0.3 |
|  | 10 | ↑ | ↑ | ↑ | ↑ | 1030 | 1400 | ○ | −2.4 | −0.1 |
| Comp. | 13 | ↑ | ↑ | ↑ | ↑ | 300 | 1140 | X | −12.6 | −0.6 |
|  | 14 | ↑ | ↑ | ↑ | ↑ | 370 | 1070 | X | −13.5 | −2 |
|  | 15 | ↑ | ↑ | ↑ | ↑ | 420 | 1090 | X | −11.9 | −1.8 |
|  | 16 | ↑ | ↑ | ↑ | ↑ | 600 | 950 | X | −14.2 | −2.3 |
|  | 17 | ↑ | ↑ | ↑ | ↑ | 720 | 1020 | X | −11.8 | −1.6 |
|  | 18 | ↑ | ↑ | ↑ | ↑ | 800 | 1210 | X | −8.6 | −0.4 |
|  | 19 | ↑ | ↑ | ↑ | ↑ | 910 | 1180 | X | −9.7 | −0.5 |
|  | 20 | ↑ | ↑ | ↑ | ↑ | 1080 | 850 | X | −14.5 | −3.2 |
|  | 21 | 14.5 | 2.5 | 11.5 | 4.6 | 600 | 900 | ○ | −3.5 | 0 |
|  | 22 | 13.5 | 2.5 | 10.5 | 4.2 | 600 | 900 | ○ | −5.1 | −0.5 |
|  | 23 | 12.5 | 2.5 | 9.5 | 3.8 | 600 | 900 | X | −12.7 | −2.7 |
|  | 24 | 11.5 | 2.5 | 8.5 | 3.4 | 600 | 900 | X | −15.1 | −4.6 |
| Emb. | 11 | 10 | 2 | 7.5 | 3.75 | 560 | 1530 | ○ | −4.2 | −1.2 |
|  | 12 | 9.5 | 1.8 | 7.2 | 4 | 570 | 1410 | ○ | −4.7 | −1.4 |
| Comp. | 25 | 10 | 2 | 7.5 | 3.75 | 600 | 950 | X | −14.9 | −6.2 |
|  | 26 | 9.5 | 1.8 | 7.2 | 4 | 670 | 1110 | X | −15.6 | −5.3 |
|  | 27 | 14.5 | 2.5 | 11.5 | 4.6 | 600 | 900 | ○ | −2 | 0 |

↑ : denotes the same value as shown in the above column.

layer. After that, a back coating mixture containing components described hereafter was coated on another surface of each of the non-magnetic wide bases as a back coat layer so as to obtain an overall thickness shown in Table 1. After a calendering process, each of the non-magnetic wide film bases 2 was slitted into a magnetic recording tape 1 (magnetic recording medium 1) having a width of 12.65 mm.

It should be noted that the thickness of each of the abovementioned layers shown in Table 1 designates a thickness thereof after undergoing the calendering process as mentioned in the foregoing.

| Components of a magnetic coating mixture | |
| --- | --- |
| ferromagnetic iron oxide powder (BET 50 m²/g) | 100 parts |
| vinyl chloride copolymer (MR-110; NIPPON ZEON) | 10 parts |
| polyurethane (UR-8300; TOYOBO)) | 10 parts |
| polyisosianate (coronate L; NIPPON POLYURETHANE INDUSTRY) | 5 parts |
| α-alumina (mean particle size 0.3 μm) | 6 parts |
| miristic acid | 1 part |
| butyl-stearate | 1 part |
| methyl ethyl keton | 100 parts |
| cyclohexanone | 100 parts |
| toluene | 50 parts |
| Components of back coating mixture | |
| carbon black (mean primary particle size 20 nm) | 100 parts |
| carbon black (mean primary particle size 200 nm) | 5 parts |
| nitrocellulose | 50 parts |
| Polyurethane (UR-8300; TOYOBO)) | 10 parts |
| Polyisocyanate (coronateL; NIPPON POLYURETHANE INDUSTRY) | 10 parts |
| methyl ethyl keton | 500 parts |
| cyclohexanone | 300 parts |
| toluene | 200 parts |

Comparative Examples 1–24

The same magnetic coating mixture as that of the embodiments 1–10 sufficiently mixed and dispersed was coated on each of the non-magnetic wide film bases 2 of comparative examples 1–24 having Young's modulusli Y(TD), Y(MD) and a thickness thereof shown in Table 1 so that each of the comparative examples has a thickness of the magnetic layer 3 shown in Table 1. Further, after the same back coating layer 5 as that of the embodiments 1–10 was respectively formed on the back surface of each of the above non-magnetic wide film bases 2 and a calender treatment was performed so as to obtain the overall thickness of the tape 1 as shown in Table 1, each of the non-magnetic wide film bases 2 was slitted into a magnetic tape 1 having a width of 12.65 mm.

Embodiments 11, 12

The same magnetic coating mixture as that of the embodiments 1–10 except for the ferromagnetic acicular iron powder (BET of 70 m²/g is employed in these embodiments) was coated on each of the non-magnetic wide film bases 2 of embodiments 11, 12 each having a thickness and Young's modulusli Y(TD), Y(MD) shown in Table 1 so as to have a thickness shown in Table 1. Further, after the same back coating layer 5 as that of the embodiments 1–10 was respectively formed on the back surface of each of the above non-magnetic wide film bases 2 and a calender treatment was performed so as to obtain the overall thickness of the tape as shown in Table 1, each of the non-magnetic wide film bases was slitted into a magnetic tapes having a width of 12.65 mm.

Comparative Examples 25-27

The same magnetic coating mixture as that of the embodiments 11-12 was coated on each of the non-magnetic wide film bases 2 of comparative examples 25-27 each having a thickness and Young's modulusli Y(TD), Y(MD) shown in Table 1 so as to have a thickness shown in Table 1. Further, after the same back coating layer 5 as that of the embodiments 1-10 was respectively formed on the back surface of each of the above non-magnetic wide film bases 2 and a calender treatment was performed so as to obtain the overall thickness of the tape as shown in Table 1, each of the non-magnetic wide film bases 2 was slitted into a magnetic tape 1 having a width of 12.65 mm.

Each of the tapes of the aforementioned embodiments 1-10 and the comparative examples 1-24 was installed in a VHS-C type cassette (another industry standard format) by a length of 60 m, and each of the tapes of the cassettes was tested regarding an edge damage of the tape, an audio-output and RF-output by using the VHS type video deck (JVC model SC-1000).

On the other hand, each of the tapes 1 of the aforementioned embodiments 11, 12 and the comparative examples 25-27 was installed in a VHS-type cassette by a length of 300 m, and each of the cassettes was tested regarding the edge damage of the tape, the audio-output and RF-output by using VHS type video deck (JVC model BR-7000), of which magnetic heads were made of laminated thin cores.

The edge damage of the tape is evaluated by using 3-step method by observing edge portions of the tape 1 after 10-repeated run, wherein ○ symbol designates good, Δ symbol poor, and X symbol unacceptable comparing with the initial state of the tape 1.

Further, a value of the audio-output was obtained in such a manner that an audio-signal of 10 kHz was recorded and reproduced on and from portions of each of the tapes which portions had undergone loading and unloading operations in the video tape deck and a maximum degradation value (dB) of an output therefrom caused by loading and unloading operations was determined as the resultant audio-output of each of the tapes 1.

The RF-output was obtained in such manner that a video signal of 50% white was recorded and reproduced on and from each of the tapes 1, wherein regarding the embodiments 1-10 and the comparative examples 1-24, each of the value of RF-output was determined by comparing with the signal output from the comparative example No. 21 of which signal output is to be 0 dB as a reference, and regarding the embodiments 11, 12 and the comparative examples 25-27, each of the value of RF-output was determined by causing the signal output of the comparative example 27 to be 0 dB as a reference.

The results of the edge damage, the audio-output and the RF-output regarding the embodiments 1-12 and the comparative examples 1-27 together with the experimental conditions are shown in Table 1.

Embodiments 13-18 and Comparative Examples 28-34

The same magnetic coating mixture as that of the embodiments 1-10 was coated on each of the non-magnetic wide film bases 2 of embodiments 13-18 and comparative examples 28-34 each having a thickness of 9.4 $\mu$m and Young's modulusli Y(TD), Y(MD) shown in Table 2 so as to obtain the magnetic layer 3 having a thickness of 2.6 $\mu$m. Further, after the same back coating layer 5 having a thickness of 0.5 $\mu$m as that of the embodiments 1-10 was respectively formed on the back surface of each of the above non-magnetic wide film bases 2 and a calender treatment was performed, each of the non-magnetic wide film bases 2 was slitted into a magnetic tape 1 having a width of 12.65 mm and an overall thickness of 12.5 $\mu$m.

It should be noted that the thickness of each of the abovementioned layers shown in Table 2 designates a thickness thereof after undergoing the calendering process as mentioned in the foregoing.

Embodiments 19-21 and Comparative Examples 35-38

As shown in Table 2, the same magnetic coating mixture as that of the embodiment 13 was coated on each of the non-magnetic wide film bases 2 of embodiments 13-18 and comparative examples 28-34 each having a thickness of 9.4 $\mu$m and Young's modulusli Y(TD), Y(MD) shown in Table 2 so as to obtain the magnetic layer 3 having a thickness of 2.6 $\mu$m. Further, after the same back coating layer 5 having a thickness of 0.5 $\mu$m as that of the embodiment 13 except for changing of the weight parts of isocyanate instead of the weight parts of the polyisocyanate was respectively formed on the back surface of each of the above non-magnetic wide film bases 2 and a calender treatment was performed, each of the non-magnetic wide film bases 2 was slitted into a magnetic tape having a width of 12.65 mm and an overall thickness of 12.5 $\mu$m.

Each of the tapes 1 of the aforementioned embodiments 13-21 and the comparative examples 28-38 was installed in the VHS type cassette, and each of the tapes 1 of the cassettes was tested regarding an edge damage of the tape 1, an audio-output and an RF-output by using the VHS type video deck (JVC model SC-1000). The measuring method is as follows:

(a) Cupping rate; a curled tape 10 was placed on a glass flat plate 11 with the caved side down as shown in FIG. 8, and a height of the curled tape 10 was obtained by measuring a height from the glass flat plate 11 to a top of the curled tape 10 with a vernier caliper. The cupping rate was obtained from the equation (4) as mentioned in the foregoing, i.e., the cupping rate was obtained in such a manner that a value of the height divided by the tape width of 12.65 mm was multiplied by 100.

(b) Track linearity; this test was conducted to examine if a track pattern recorded on the tape 1 was correct or not. The linear control signal track was used as a reference line, and the distance from the control track was measured at various points on obliquely recorded tracks. From the measured distance values the track linearity was calculated and defined as a deviation from the theoretically correct oblique track patterns.

The maximum value among the deviations from the theoretical track, is taken as a linearity value.

(c) RF output; each of RF output of the tapes 1 was obtained by causing the video signal output of the tape of the embodiment 14 at 4 MHz to be 0 dB as a reference level.

Figure 6:
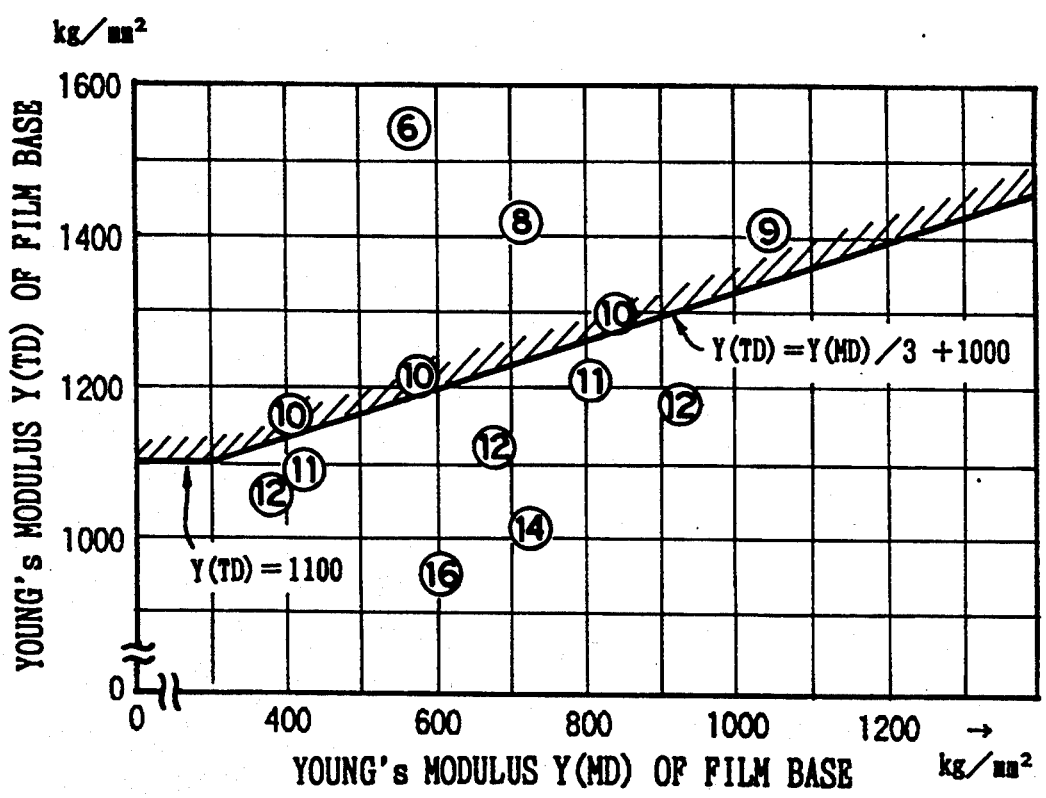
FIG. 6 is a Y(TD)-Y(MD) diagram showing a correlation between a track linearity and Young's modulus of the film base.
Figure 7:
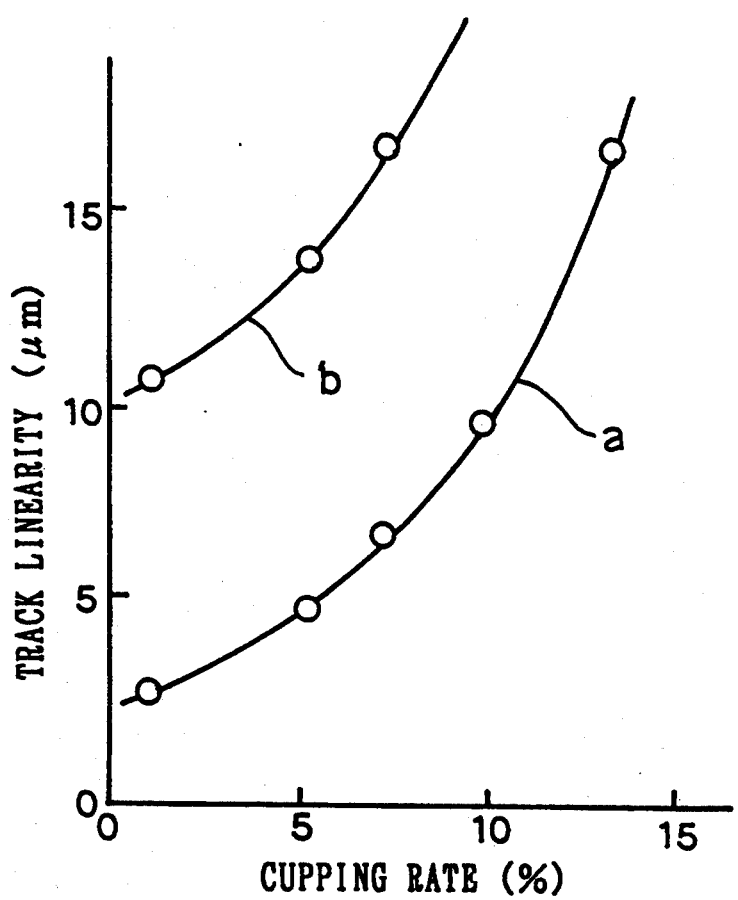
FIG. 7 is a graph showing an experimental relation between a track linearity and a cupping rate.

The above results are shown in FIG. 6 and FIG. 7 and Table 2 as described hereafter.

Further, relations among tested characteristics of the tape are shown in FIGS. 2 through 8 as described hereafter.

Figure 2:
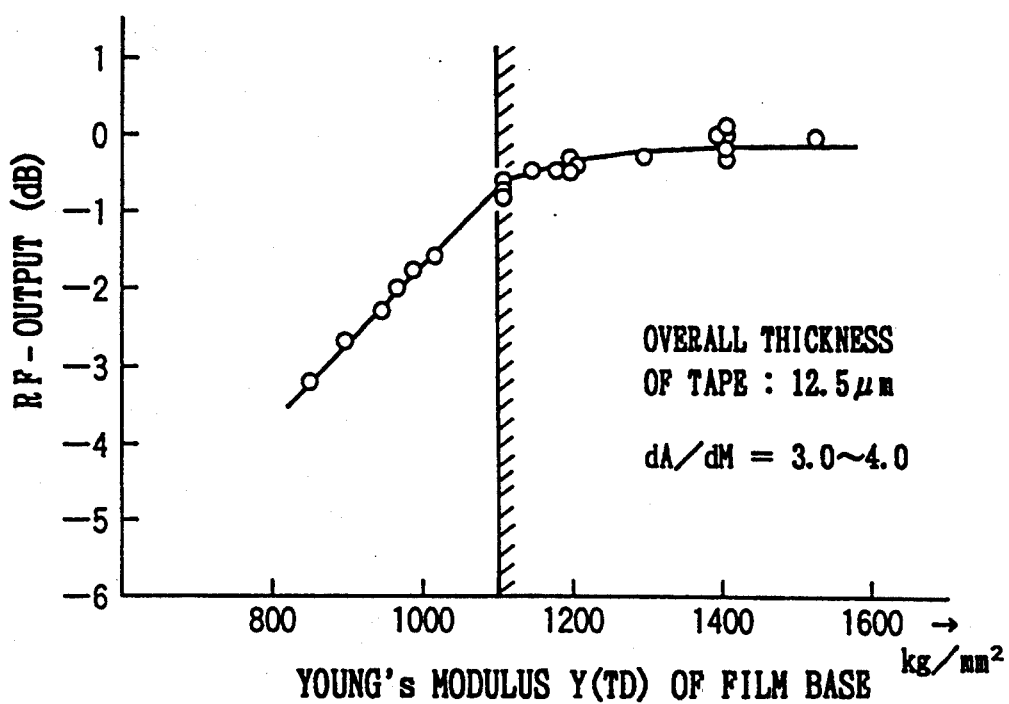
FIG. 2 is a graph showing a relation between a Young's modulus Y(TD) of a film base in a traversing direction and an RF-output regarding each of the embodiments 1-12 and the comparative examples 1-27.

FIG. 2 is a graph showing a relation between a Young's modulus Y(TD) of a film base in a traversing direction and an RF-output regarding each of the embodiments 1–12 and the comparative examples 1–27.

Figure 3:
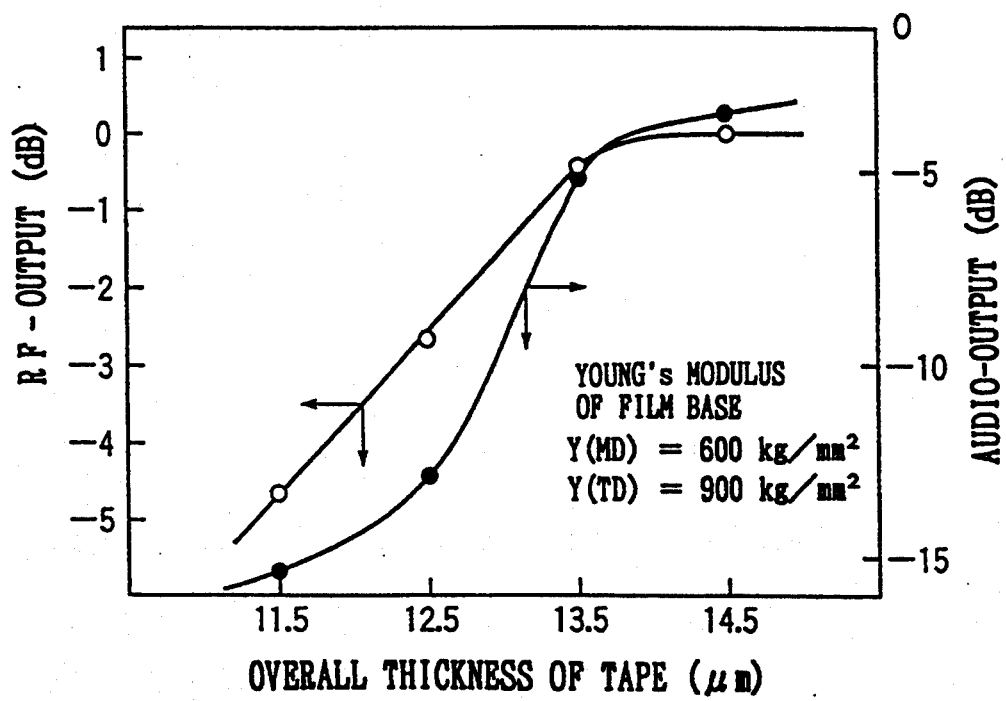
FIG. 3 is a graph showing a relation between an RF-output and an overall thickness together with a relation between an audio-output and an overall thickness regarding each of the embodiments 1-12 and the comparative examples 1-27.

FIG. 3 is a graph showing a relation between an RF-output and an overall thickness together with a relation between an audio-output and an overall thickness regarding each of the embodiments 1–12 and the comparative examples 1–27.

Figure 4:
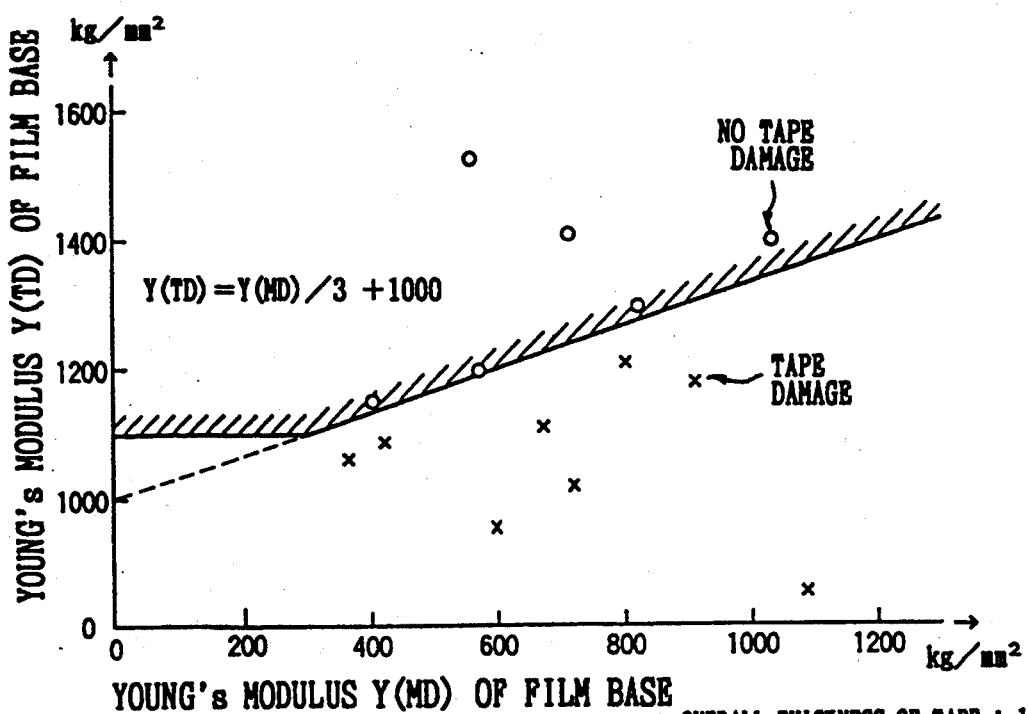
FIG. 4 is a graph showing an edge damage and Young's modulus of a film base in a longitudinal direction regarding each of the embodiments 1-12 and the comparative examples 1-27.

FIG. 4 is a graph showing an edge damage and Young's modulus of a film base regarding each of the embodiments 1–12 and the comparative examples 1–27.

Figure 5:
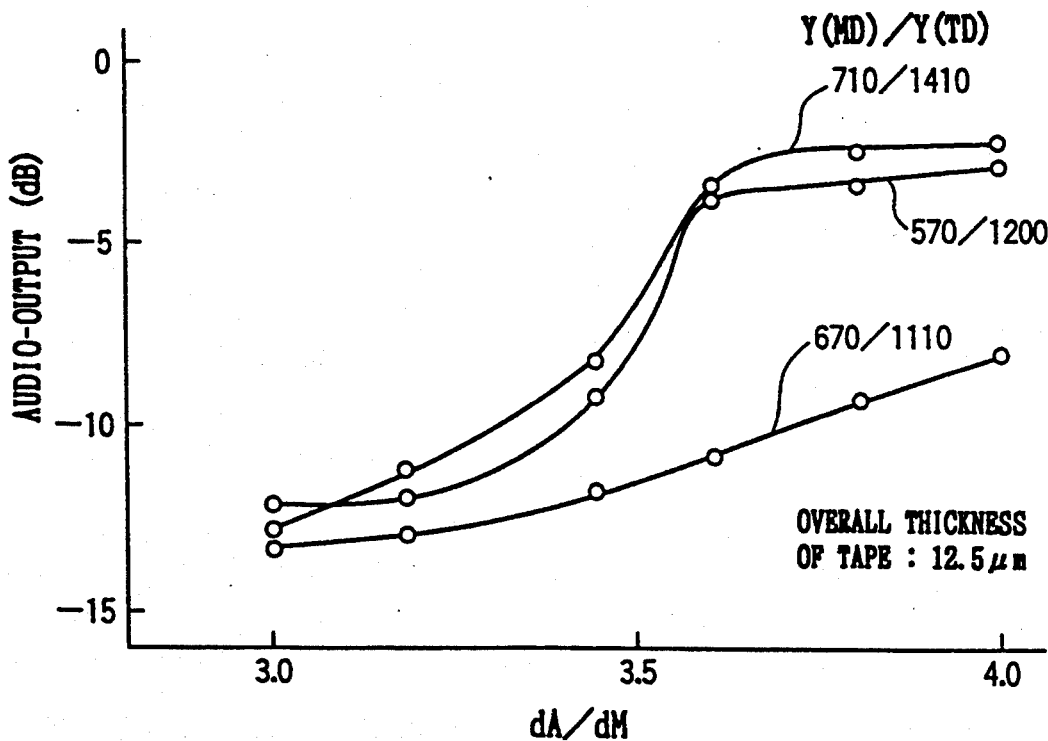
FIG. 5 is a graph showing a relation between an audio-output and a ratio dA/dM of a film base thickness (dA) and a magnetic layer thickness (dM) regarding each of the embodiments 1-12 and the comparative examples 1-27.

FIG. 5 is a graph showing a relation between an audio-output and a ratio dA/dM of a film base thickness (dA) and a magnetic layer thickness (dM) regarding each of the embodiments 1–12 and the comparative examples 1–27.

As clearly understood from FIG. 3, when the overall thickness of the tape 1 is less than 12.5 μm, both the RF-output and the audio-output are degraded.

When the Young's modulus Y(TD) of the film base 2 in the traversing direction is more than 1100 Kg/mm², however, the RF-output is not degraded even though the overall thickness of the tape is as thin as 12.5 μm as shown in FIG. 2.

Referring to FIG. 4, when the Young's moduluslı Y(TD) and Y(MD) of the tape 1 in the traversing and longitudinal directions satisfy inequalities (1) and (2) described hereafter, the edge damage does not occur, otherwise, the edge damage occurs. Hereunder, the inequalities (1) and (2) (3) are cited again for a convenience of discussion.

$$Y(TD) \geq Y(MD)/3 + 1000 \ (Kg/mm^2) \quad \ldots (1)$$

$$Y(TD) \geq 1100 \ (Kg/mm^2) \quad \ldots (2)$$

Further, referring to FIG. 5, it will be understood that in a range where the ratio dA/dM of the film base thickness dA to the magnetic layer thickness dM is more than or equal to 3.6, the audio-output shows a high output level, however, when the Young's moduluslı Y(TD), Y(MD) of the film base does not satisfy the inequalities (1) and (2), the audio-output shows a low output level even though the ratio dA/dM of the film base thickness dA to the magnetic layer thickness dM is more than or equal to 3.6 as follows:

$$dA/dM \geq 3.6 \quad \ldots (3)$$

FIG. 6 is a Y(TD)-Y(MD) diagram showing a correlation between a track linearity and Young's modulus of the film base 2.

Referring to FIG. 6, in two regions defined by two lines of Y(TD)=(Y(MD)/3)+1000 and Y(TD)=1100, an upper region satisfies inequalities (1) and (2). In this diagram, data of the embodiments 13–18 and the comparative examples 28–34 are plotted by using ◯ symbols, wherein each of the ◯ symbols, a value of track linearity is indicated in "μm".

As seen from FIG. 6, all the data of the film bases 2 within the upper region of the present invention satisfy to be less than or equal to 10 μm regarding the track linearity. Thus, the problem of interchangeability is prevented.

FIG. 7 is a graph showing an experimental relation between a track linearity and a cupping rate, wherein a line "a" designates a first group which satisfies the inequalities (1) and (2), i.e., Y(MD)=570, Y(TD)=1200 (the embodiments 15, 19, 21 and the comparative example 35), and a line "b" designates a second group which does not satisfy the inequalities (1), i.e., Y(MD)=670, Y(TD)=1110 (the comparative example 31, and 36–38).

Referring to FIG. 7, as seen from the line "a", the track linearity of the first group satisfying inequalities (1) and (2) is less than or equal to 10 μm when the cupping rate is less than or equal to 10%. However, as seen from the line "b", the track linearity of the second group not satisfying the inequalities (1) is degraded even if the cupping rate is less than or equal to 10%.

The results of the FIGS. 6 and 7 are shown in Table 2.

TABLE 2

|  |  | * Y. modulus of film base | | isocyanate (parts) | cupping rate (%) | track linea. (μm) | RF-output (dB) |
| --- | --- | --- | --- | --- | --- | --- | --- |
|  |  | Y (MD) | Y (TD) |  |  |  |  |
| Emb. | 13 | 400 | 1150 | 10 | 9.5 | 10 | −0.5 |
|  | 14 | 560 | 1530 | 10 | 9.5 | 6 | 0 |
|  | 15 | 570 | 1200 | 10 | 9.5 | 10 | −0.3 |
|  | 16 | 710 | 1410 | 10 | 9.5 | 8 | −0.2 |
|  | 17 | 820 | 1300 | 10 | 9.5 | 10 | −0.3 |
|  | 18 | 1030 | 1400 | 10 | 9.5 | 9 | −0.1 |
| comp. | 28 | 370 | 1070 | 10 | 9.5 | 12 | −2.0 |
|  | 29 | 420 | 1090 | 10 | 9.5 | 11 | −1.8 |
|  | 30 | 600 | 950 | 10 | 9.5 | 16 | −2.3 |
|  | 31 | 670 | 1110 | 10 | 9.5 | 12 | −0.6 |
|  | 32 | 720 | 1020 | 10 | 9.5 | 14 | −1.6 |
|  | 33 | 800 | 1210 | 10 | 9.5 | 11 | −0.4 |
|  | 34 | 910 | 1180 | 10 | 9.5 | 12 | −0.5 |
| Emb. | 19 | 570 | 1200 | 8 | 7 | 7 | −0.5 |
|  | 20 | 570 | 1200 | 6 | 5 | 5 | −0.5 |
|  | 21 | 570 | 1200 | 4 | 1 | 3 | −0.3 |
| comp. | 35 | 570 | 1200 | 15 | 13 | 17 | −0.8 |
|  | 36 | 670 | 1110 | 8 | 7 | 17 | −0.8 |
|  | 37 | 670 | 1110 | 6 | 5 | 14 | −0.6 |
|  | 38 | 670 | 1110 | 4 | 1 | 11 | −0.5 |

* (Kg/mm²)

From Table 2, it will be understood that the tape 1 having an overall thickness of 12.5 μm of the present invention has an excellent track linearity and RF-output.

As mentioned in the foregoing, according to the present invention, it is possible to maintain an excellent head-tape contact characteristic together with an excellent track linearity of the tape 1 and to prevent edge damage of the tape from occurring by causing the Young's modulusli Y(TD), Y(MD) of the film base 2 to satisfy the inequalities (1) and (2) even though the overall thickness of the tape 1 is made less than or equal to 12.5 μm.

Further, it is possible to obtain the tape 1 that prevents an edge damage due to the stress subjected to the edges thereof from occurring and prevents a degradation of the head-tape contact characteristic by causing the Young's modulusli Y(TD), Y(MD) of the film base to satisfy the inequalities (1) and (2) and by causing the film base thickness dA and the magnetic layer thickness dM to satisfy the inequality (3).

Further, when the recording medium 1 of the present invention is a magnetic tape 1, the track linearity is improved by causing the cupping rate of the tape 1 to be controlled.

What is claimed is:

1. A magnetic tape having a magnetic layer of a magnetic powder in a binder of resin, used for a magnetic recording and reproducing apparatus, comprising:
   a polyester film base having a thickness dA and having a first Young's modulus Y(MD) in a longitudinal direction of the magnetic tape and a second Young's modulus Y(TD) in a traversing direction thereof: and
   the magnetic layer being provided on a surface of the polyester film base, the magnetic layer having a thickness dM, wherein the first Young's modulus Y(MD) and the second Young's modulus Y(TD) thereof respectively satisfy inequalities (1) and (2) defined as:

$$Y(TD) \geq Y(MD)/3 + 1,000 \ (Kg/mm^2) \quad (1)$$

$$Y(TD) \geq 1,100 \ (Kg/mm^2) \quad (2)$$

so as to minimize edge damages of the magnetic tape, and the magnetic tape having an overall thickness less than or equal to 12.5 μm, and a ratio dA/dM satisfying an inequality (3) defined as:

$$dA/dM \geq 3.6 \quad (3)$$

so as to enhance a head-tape contact characteristic between the magnetic tape and a magnetic head of the recording and reproducing apparatus.

2. A magnetic tape as defined in claim 7, wherein said magnetic tape has a cupping rate defined as a ratio (A/B×100%) of a height A of a curled tape to a width B of the curled tape in the traversing direction thereof being less than or equal to 10%.

* * * * *